(12) United States Patent
van der Horn

(10) Patent No.: US 6,821,075 B2
(45) Date of Patent: Nov. 23, 2004

(54) HOIST WITH TRAILER HITCH ATTACHMENT

(76) Inventor: Tiemen J. van der Horn, 47 Cockburn Street, Box 764, Richmond, Ontario (CA), K0A 2Z0

( * ) Notice: Subject to any disclaimer, the term of this patent is extended or adjusted under 35 U.S.C. 154(b) by 0 days.

(21) Appl. No.: 10/190,484

(22) Filed: Jul. 9, 2002

(65) Prior Publication Data

US 2003/0007855 A1 Jan. 9, 2003

(30) Foreign Application Priority Data

Jul. 9, 2001 (CA) ............................................. 2354036

(51) Int. Cl.[7] .................................................. B60P 9/00
(52) U.S. Cl. ...................... 414/462; 414/543; 212/180; 212/901
(58) Field of Search ................. 414/462, 542, 414/543; 212/180, 901, 305

(56) References Cited

U.S. PATENT DOCUMENTS

| | | | |
|---|---|---|---|
| 708,045 A | 9/1902 | Houdyshell | |
| 1,340,893 A | 5/1920 | Haas | |
| 2,487,305 A | 11/1949 | Bridegroom | |
| 3,139,198 A | 6/1964 | Penney et al. | |
| 3,519,154 A | 7/1970 | Riley | |
| 4,111,316 A | * 9/1978 | Wappler | 414/550 |
| 4,226,331 A | 10/1980 | Dumond | |
| 4,260,064 A | * 4/1981 | Ekstam | 212/231 |
| 4,419,038 A | 12/1983 | Pendergraft | |
| 4,746,263 A | 5/1988 | Cook | |
| 4,881,864 A | * 11/1989 | Amato | 414/543 |
| 4,961,604 A | 10/1990 | Kisner | |
| 5,120,186 A | * 6/1992 | Jorgenson | 414/686 |
| 5,211,526 A | * 5/1993 | Robinette | 414/550 |
| 5,788,095 A | * 8/1998 | Watson | 212/180 |
| 6,007,289 A | * 12/1999 | Kruse et al. | 414/462 |
| 6,042,328 A | 3/2000 | McVaugh | |
| 6,357,991 B1 | * 3/2002 | Hamlett | 414/538 |
| 6,478,528 B1 | * 11/2002 | Asbury | 414/550 |

* cited by examiner

Primary Examiner—Joe Dillon, Jr.
(74) Attorney, Agent, or Firm—Freedman & Associates

(57) ABSTRACT

A hoist kit for vehicles such as pickup trucks and sport utility vehicles is described. The hoist kit engages a standard receiver hitch and when erect allows loading of the vehicle and optionally an attached trailer. The hoist when erect also can be used to lift or winch within all points 180 deg. behind vehicle to which it is engaged. Additionally, when used with a vehicle having a tailgate the hoist does not interfere with the normal operation of the tailgate. The hoist also features structural supports that are deployed to contact the ground thereby reducing the stress on receiver hitch and some structural members of the hoist.

8 Claims, 11 Drawing Sheets

HOIST WITH TRAILER HITCH ATTACHMENT

FIELD OF THE INVENTION

This invention relates to hoists and cranes mounted to vehicles and particularly to hoists that use a trailer hitch as a structural attachment.

BACKGROUND OF THE INVENTION

Pickup trucks are versatile vehicles used for hauling cargo. Many pickup trucks are used by businesses for delivering merchandise and transporting goods. Often the cargo transported is not easily loaded and unloaded. When people make the effort to load and unload heavy goods from the raised bed of a pickup truck they risk personal injury, particularly to the lower back.

In order to help people load and unload cargo from small trucks, a variety of small hoists suitable for attachment to a conventional trailer hitch have been developed. For example, in U.S. Pat. No. 4,746,263, Cook describes a small retractable hoist. This hoist is mounted to the bumper of a pickup truck and, when it is not needed, is stored in the bumper. This hoist is compact and versatile however the truck directly supports the load that the hoist lifts. Clearly, if heavy loads are to be lifted then the structure of the truck proximate the bumper should be reinforced. Otherwise, the structural supports for the bumper are being used in a way that they were not intended and in the event that a very heavy load is lifted, the crashworthiness of the truck may be compromised.

In U.S. Pat. No. 4,419,038, Pendergraft also teaches a hoist design for a small truck. The hoist taught by Pendergraft also folds into a large rear vehicle bumper. This hoist optionally features structural supports that increase the effective width of the truck when the hoist is properly deployed. Although this hoist has the potential to be very sturdy, it also is likely to be very costly. Additionally, the hoist taught by Pendergraft is raised from one side of the truck. Clearly, this would be inconvenient if it were necessary to load the truck from the opposite side.

In U.S. Pat. No. 4,226,331, Dumond teaches the design of a hoist for use with a three-point hitch of a tractor. This design uses hydraulic actuators for movement. The hoist is notable in that it features supports that contact the ground proximate the load bearing member of the hoist. This structure complicates the mounting of a trailer to the tractor when the hoist is deployed.

In U.S. Pat. No. 6,042,328, McVaugh demonstrates a lifting device for a small truck that is shown attaching directly to a trailer hitch attachment. The lifting device is shown spanning a considerable length of the bed of the truck. Since this device does not include an external support, the weight of the lift and any load that it carries are supported exclusively by the trailer hitch. A lifting device of this type produces substantial torque at the trailer hitch attachment. Unless the trailer hitch is designed to bear this type of load it is most probable that the trailer hitch is damaged when the lift is used.

It would be beneficial to have a small, cost effective hoist for pickup trucks that is easily transportable, supports heavy loads and does not involve a costly structural modification to the pickup trucks. Additionally, it would be beneficial that such a hoist be collapsible for ease of storage.

SUMMARY OF THE INVENTION

The invention describes a hoist kit adapted for engagement with and structural support by a receiver hitch attachment, comprising: A hoist mount having a first end (insert), a second end (tongue) and a hinged joint disposed therebetween which provides rotational approximately lateral movement of the second end relative to the hinged joint when the first end is fixed, the first end which mechanically engages the receiver hitch;

a jib post which extends approximately vertically, said jib post which is mechanically coupled to the second end of the hoist mount;

a rotational boom support coupled to the jib post;

a boom which extends from the boom support, said boom which bears a weight of an external load; and, a first leg which is mechanically coupled proximate the second end of the hoist mount allowing pivotal motion relative thereto between a first position which contacts a region of ground proximate a vehicle supporting said receiver hitch attachment which structurally supports the hoist mount and a second refracted position.

Further the invention discloses a hoist kit adapted for engagement with and structural support by a receiver hitch attachment, comprising:

a hoist mount having a first end (insert) which mechanically engages a receiver hitch attachment, a second end (tongue) and a hinged joint disposed therebetween which provides approximately lateral movement of the second end relative to the hinged joint when the first end is fixed;

a jib post extending approximately vertically, said jib post mechanically coupled to the second end of the hoist mount;

a rotational boom support coupled to the jib post, a boom extending from the boom support, said boom which bears a weight of an external load; and, a first leg mechanically coupled proximate the second end of the hoist mount which allows pivotal motion relative thereto between a first position which contacts a region of ground proximate a vehicle supporting said receiver hitch attachment and which structurally supports the hoist mount and a second retracted position.

Additionally, the invention details a hoist kit adapted for engagement with and structural support by a receiver hitch attachment, comprising:

a hoist mount having a first end (insert) a second end (tongue) and a hinged joint disposed therebetween for providing rotational approximately lateral movement of the second end relative to the hinged joint when the first end is fixed, the first end which mechanically engages the receiver hitch;

a jib post which extends approximately vertically, said jib post mechanically coupled to the second end of the hoist mount;

a rotational boom support coupled to the jib post;

a boom extending from the boom support, said boom which bears a weight of an external load; and, a first leg coupled to one of said boom and said jib post which engages the ground and which supports the boom and a load supported thereby.

BRIEF DESCRIPTION OF THE DRAWINGS

The invention will now be described with respect to the drawings in which.

DETAILED DESCRIPTION OF THE INVENTION

The varieties of hoist mechanisms for light trucks usually fall into one of two categories. A first category comprises light hoists that extend from the truck. A second category comprises hoists that have their own structure and support heavy loads using the truck to enhance their stability. Hoists in the second group are likely to be bulky and heavy themselves.

Figure 1:
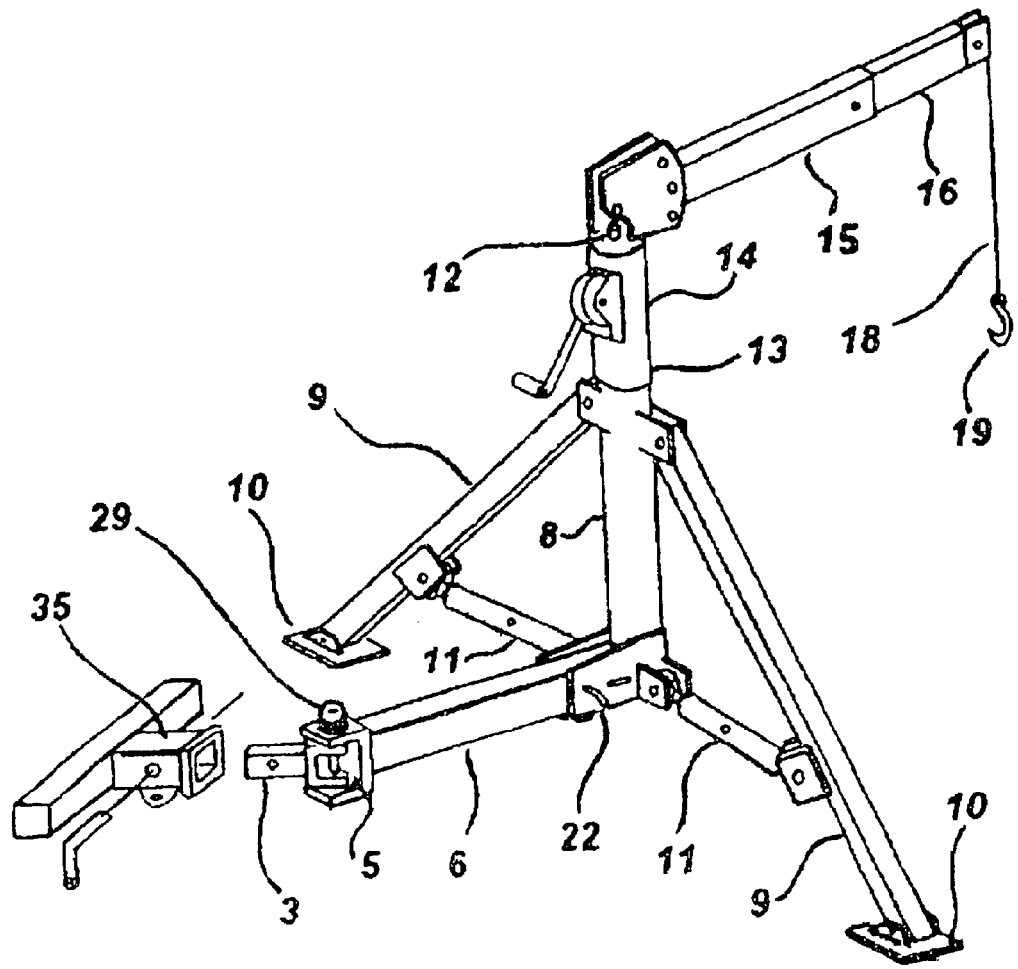
FIG. 1 is a side view of an erected hoist according to a first embodiment of the invention.

Referring to FIG. 1 a hoist according to a first embodiment of the invention is shown. The hoist includes a boom 15 with an extendable section 16. A jib post 8 allows the boom support 14 to rotate 360 deg. The jib post 8 is connected to the boom support 14 with a collar 13 proximate the base of the boom support 14. The top end of the jib post 8 includes an end plate to which a jib pin 12 is welded. The boom support 14 fits freely over the end of the jib post 8. The jib pin 12 has a hole drilled horizontally through for a cotter pin (not shown) to retain the boom support 14, allowing the boom support 14 to rotate 360 deg. around the jib post 8. The legs 9 when deployed support the jib post 8. The legs 9 are attached to the jib post 8 on both sides by metal plates welded to the jib post 8. Legs 9 are captured at one end between plates and held in position by pull pins and by adjustable links 11 connected at one end to legs 9 approximately one third of the legs length from the foot 10. The adjustable links 11 are connected at second end to the lower section of jib post 8 between plates welded on both sides of slider plate assembly 22. Each of the legs 9 has a foot 10 for contacting the ground. FIG. 1 shows the legs 9 extended equally as though the hoist is on level ground. Clearly, this is not always the case and the legs 9 are easily adjusted for somewhat uneven terrain. The legs when deployed take on the appearance of an 'A' frame. The jib post 8 is welded at the lower end to a slider plate assembly 22. The slider plate assembly 22 consists of two metal plates sandwiching the tongue 6, allowing the tongue to slide laterally, limited by a pair of slots and a slider pin. The slider plate assembly 22 is also constructed to enable hoist to fold horizontally by removing a pull pin and pulling jib post 8 clear of draw bolt 21. The tongue 6 has a hinge point where the trailer ball 29 and pivot pin 5 connect to the hoist mount insert. This hinge point created by pivot pin 5 and insert 3 allows the hoist to be deployed at any point within 180 deg. behind the vehicle. Insert 3 slides into receiver hitch 35 and is held in place by a pull pin. This embodiment of the hoist is shown with a hook 19 at the end of the cable 18.

Figure 2:
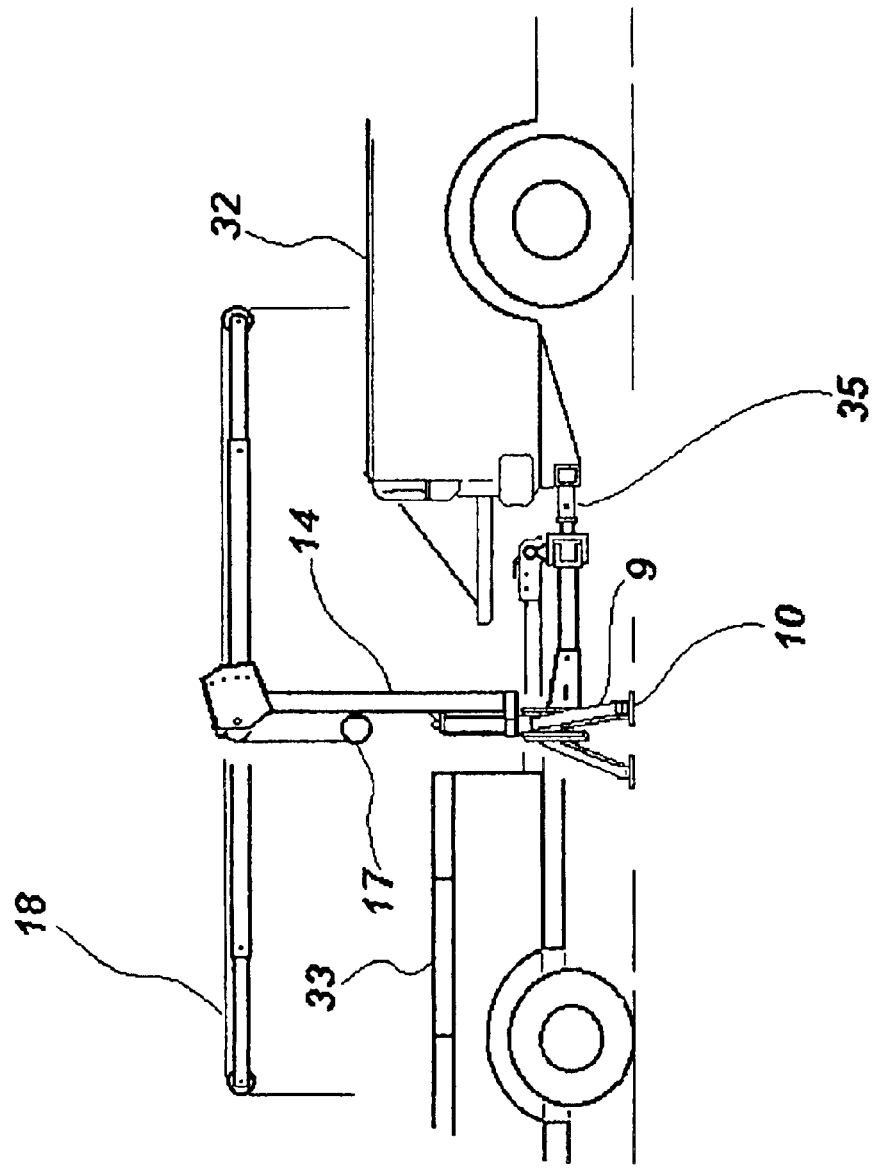
FIG. 2 is a side view of a hoist according to a first embodiment the invention attached to a pickup truck in which the pickup truck has a trailer attached to the hoist ball.

Referring to FIG. 2, a hoist according to the invention is shown attached to a receiver hitch 35 mounted to a pickup truck 32. A trailer 33 is mounted on the hoist ball of the hoist. The hoist is mated to the receiver hitch of the pickup truck 32. FIG. 2 is highly illustrative of one of the critical advantages of the invention. The hoist according to the invention does not interfere with tailgate of the pickup truck 32 or the use of a trailer. Thus, the hoist is usable for loading the pickup truck 32 as well as the trailer 33. Two feet 10 connected to the legs 9 as well as the receiver hitch 35 support the hoist. Thus, the hoist is supported at three locations that provide it with considerable stability in comparison with a single point support. The boom support 14 is rotated to the correct position for accessing either the trailer 33 or the pickup truck 32. The winch 17 contains a sufficient length of cable to ensure easy access to the load from the ground or the vehicles. The feet 10 along with the receiver hitch attachment form a triangle when viewed from above. A person of skill in the art of structural design will be aware that this design provides excellent stability. In comparison, a hoist according to the teaching of McVaugh in U.S. Pat. No. 6,042,328 would require considerable structural reinforcement resulting in a substantially heavier hoist. Although the hoist is shown attached to a pickup truck this need not be the case. Since the hoist will load the trailer it is useable with any vehicle that has a standard receiver hitch attachment. In other words, a car with a receiver hitch attachment is able to use the hoist to load heavy objects into the trailer.

Figure 3:
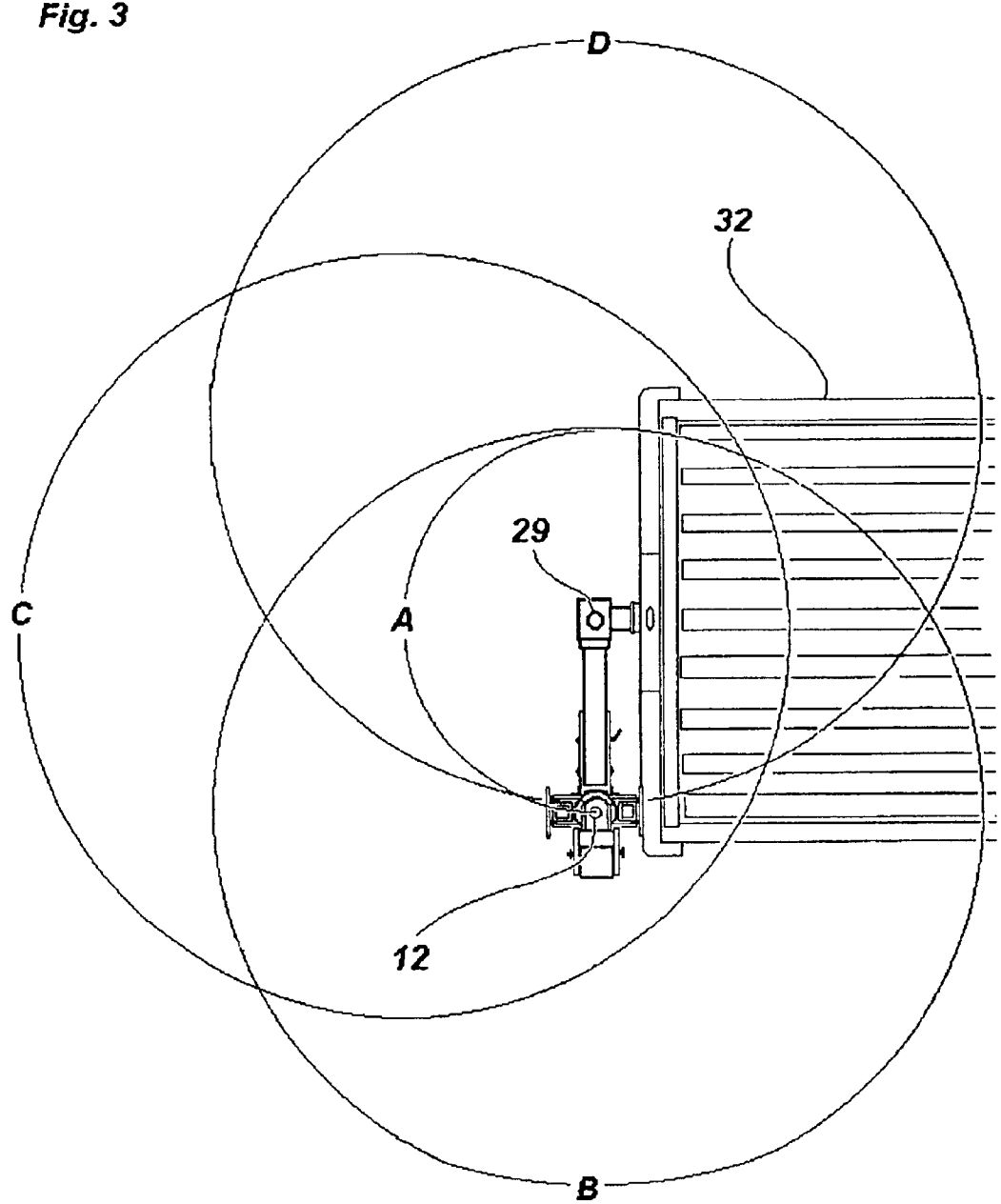
FIG. 3 is a top view of a hoist according to a first embodiment the invention with the legs retracted, attached to a pickup truck demonstrating the working areas of the hoist.

Referring to FIG. 3, a top view of the hoist according to the first embodiment of the invention is provided. This view demonstrates the arc A traced by the jib pin 12 as the hoist is rotated about the ball 29 of the hinge assembly. By rotating this way the hoist is able to load a first side of the pickup truck 32 and then be swivelled to the second other side for loading that side. The swiveling operation is easily carried out when the hoist is unloaded and the feet (not shown in this view) are partially retracted. The arcs B, C and D represent suggested working areas for the hoist where the hoist is able to structurally support a load.

Figure 4:
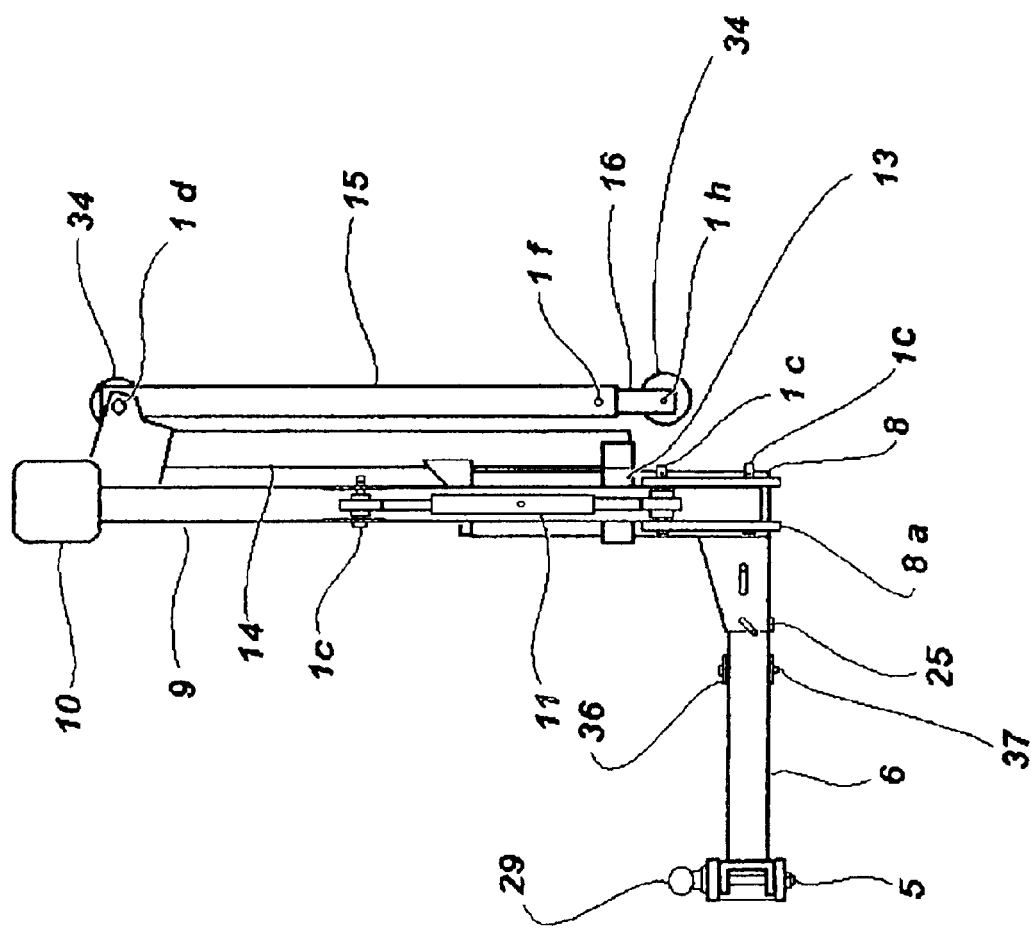
FIG. 4 is a side view of the hoist according to a first embodiment the invention with the boom folded parallel to the boom support.

Referring to FIG. 4, the hoist according to the first embodiment of the invention is shown in a partially folded position. The boom 15 has been rotated to be parallel to the boom support 14. The legs 9 have been retracted resulting in a compact assembly. Various rotational joints are structurally supported with pins 1c, 1d, 1f and 1h. Pulleys 34 are used shown for supporting a cable that is used to support a load when the hoist is erected. A tongue support bracket 36 and pin 37 hold the partially folded hoist in position preventing rotation at the location of the pin 37 when the pin 37 is properly coupled to the hoist. The hoist tongue 6 is mechanically coupled to the hinged joint. The ball 29 includes a hoist mount pivot pin 5 with a threaded end. Clearly, other methods of supporting the hoist tongue are easily envisioned by one of skill in the art of mechanical design. This view clearly illustrates the plates 8a attached to the jib post 8 that support the legs 9. A flat bar 25 helps to maintain the jib post vertically oriented when the hoist is being erected.

Figure 5:
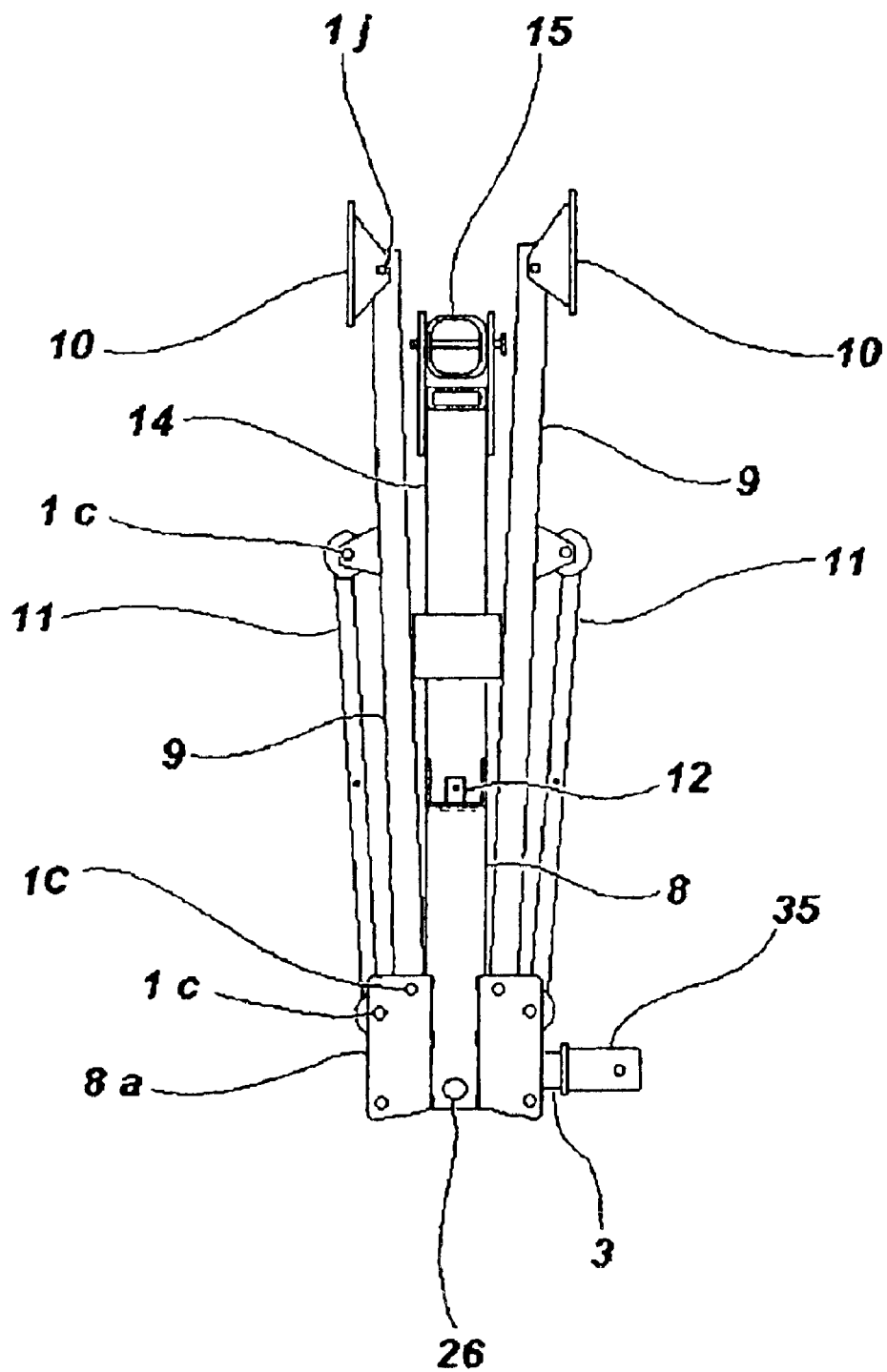
FIG. 5 is an end view of the hoist according to a first embodiment the invention with the legs retracted.

Referring to FIG. 5, a end view of the partially folded hoist is shown. This view clearly illustrates the position of the feet 10 and legs 9 in the folded position. The hoist mount insert 3 includes a mating end for attachment to a receiver hitch 35.

Figure 6:
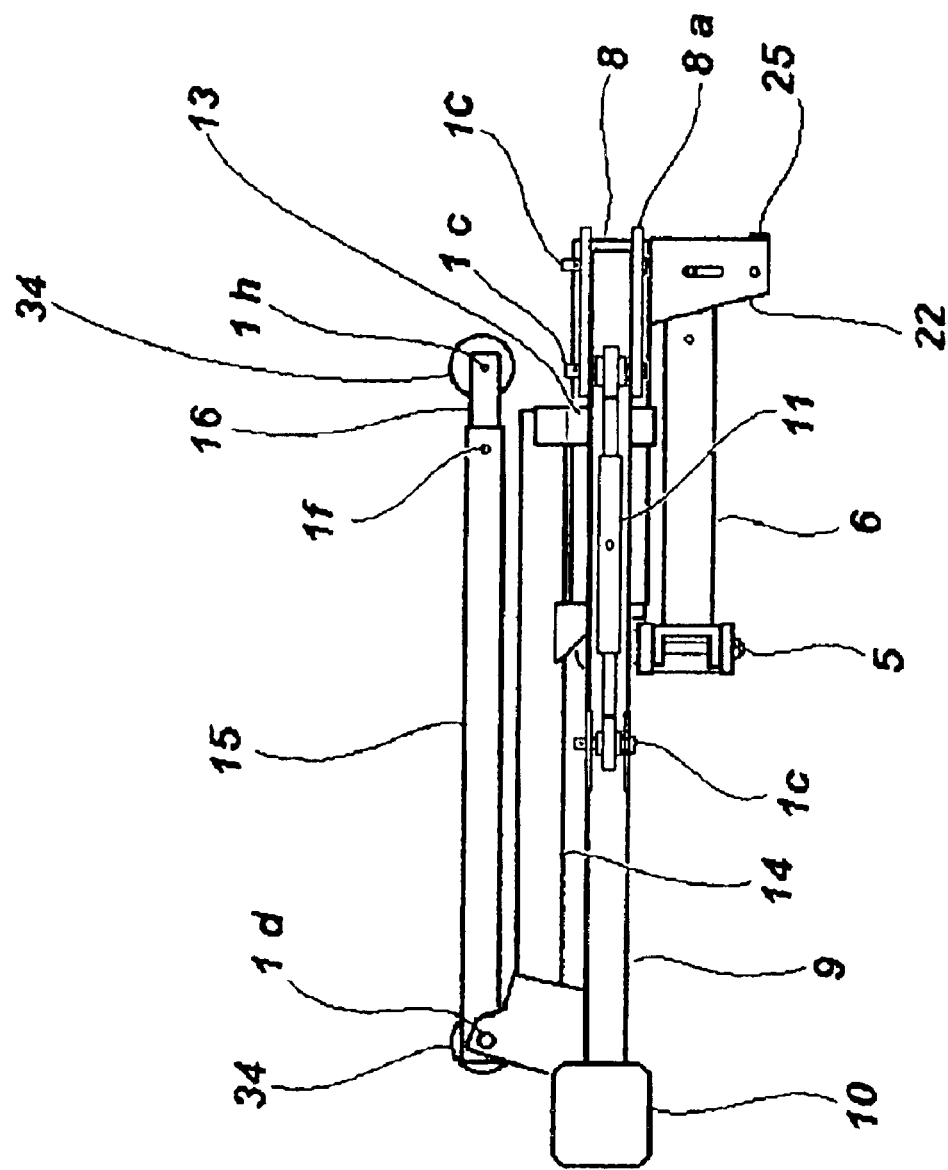
FIG. 6 is a side view of the hoist according to a first embodiment the invention with boom folded, the legs retracted and the boom support folded over the hoist mount.

Referring to FIG. 6, the partially folded hoist has been brought down parallel to the tongue 6 for stowing parallel to the bumper of the pickup truck. The attachment to the receiver hitch secures the fully folded hoist against the bumper of the pickup truck preventing it from rotating inadvertently. The slider body sides 22 maintain the jib post 8 parallel to the hoist tongue 6.

Figure 7:
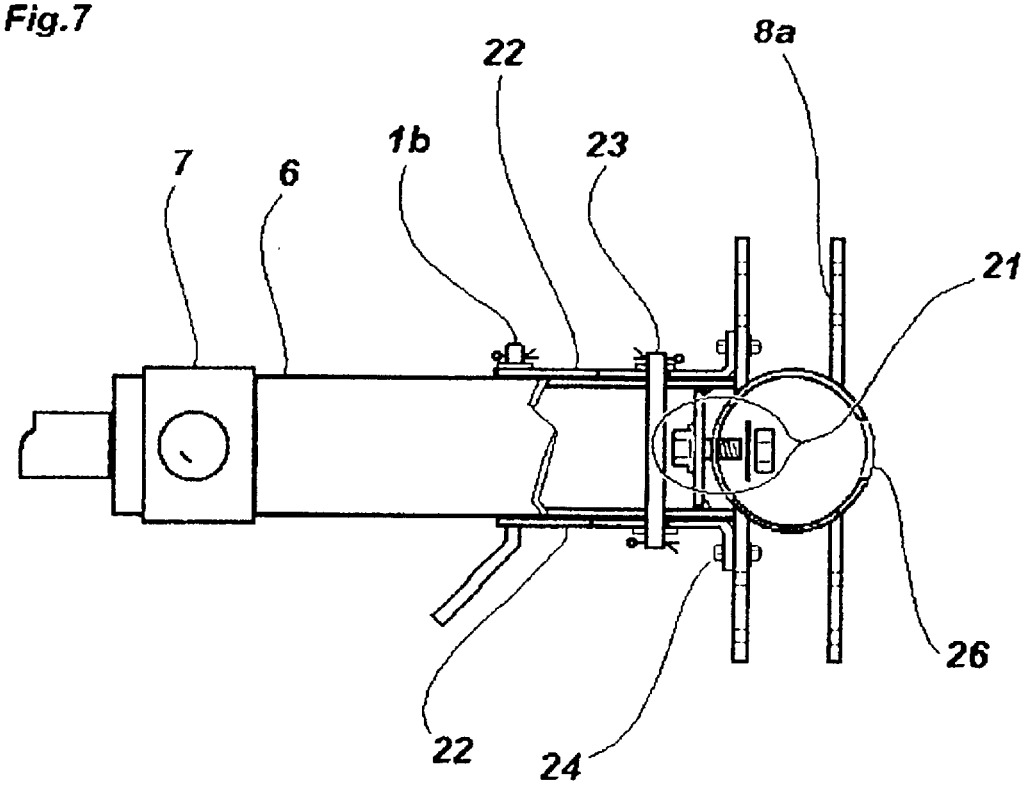
FIG. 7 is a cutaway top view of an embodiment of the mechanism that allows the jib post to fold horizontally over the hoist tongue.
Figure 8:
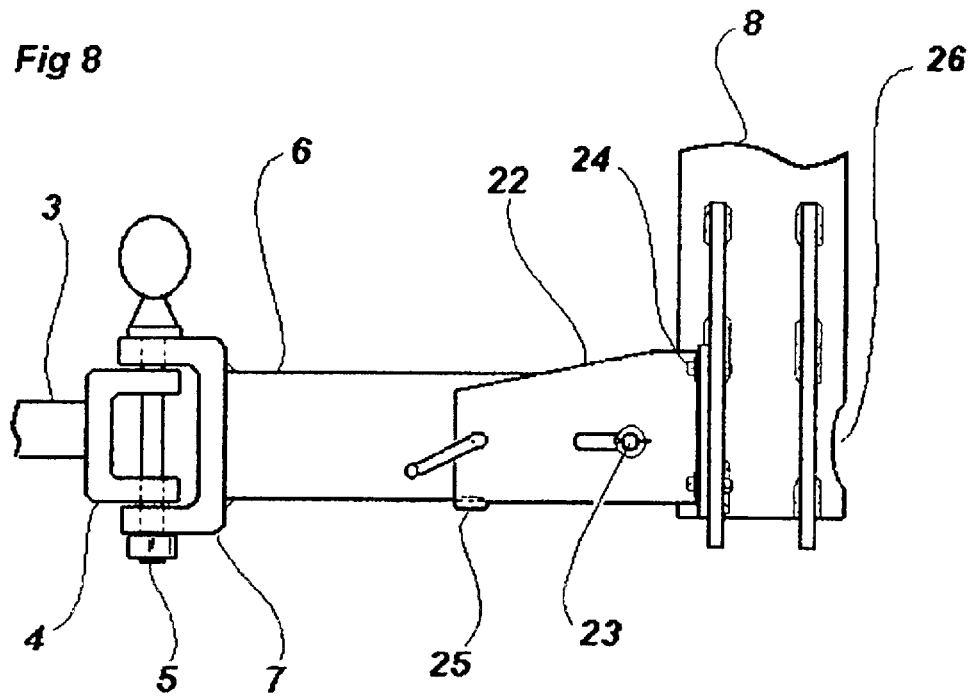
FIG. 8 is a side view of the mechanism of FIG. 7 showing the ball connected to the hoist tongue.

Referring to FIG. 7 and FIG. 8 a detail of an exemplary release mechanism is shown. The release mechanism permits the rotation shown in FIG. 6. FIG. 7 includes a pull pin 1b having a bent handle the straight end of which is held in place with a cotter pin. Additionally, a slider pin assembly 23 is also held in place with cotter pins. The slider pin assembly 23 and the pull pin 1b are used to support the jib post in the erect position. When jib post is erected, a drawing bolt assembly 21 is tightened from the access hole 26 to help stiffen the hoist. The hoist tongue 6 is coupled to the hoist mounting plate 4 with a hoist mount pivot pin 5. The hoist tongue 6 has a bracket 7 at one end for connection with hoist mount insert 3 allowing the hoist to be positioned on either side of the receiver hitch and points between.

Figure 9:
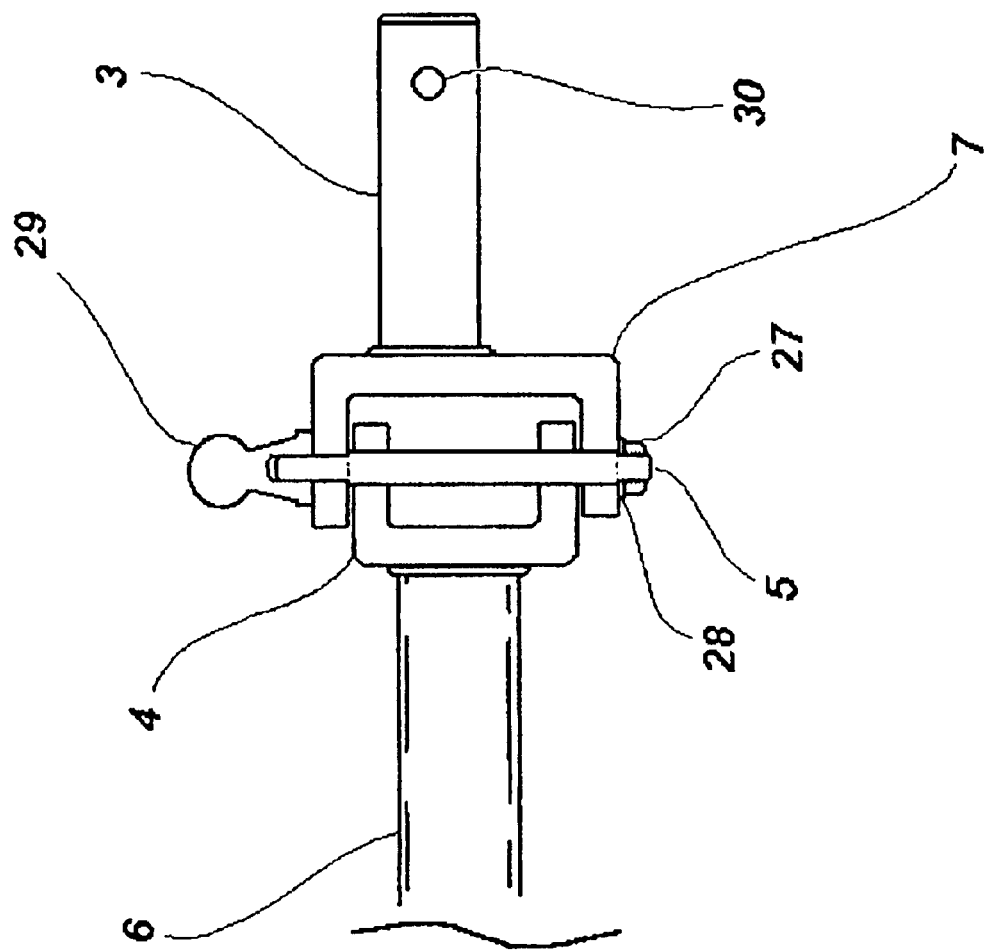
FIG. 9 is a aide view of the hoist mount according to the invention.

Referring to FIG. 9 a detail view of an exemplary receiver hitch attachment is shown. It should be noted that the use of the hoist does not interfere with the trailer provided there is no need to move the hoist to the other side of the truck. If it is necessary to move the hoist to the other side of the truck then it is a simple matter to disconnect the trailer and reattach it after moving that hoist. The hoist mount pivot pin 5 is shown fastened at one end with a washer 28 and a nut 27 and fastened by the ball 29 having internal threads. Optionally, the hoist mount pivot pin 5 has a shoulder that contacts the side opposite the ball 29 of the bracket 7. Also, a second shoulder is optionally added proximate the nut to prevent compression of the bracket 7. Clearly, a variety of options are optionally employed to keep the hoist mount pivot pin 5 in position.

Figure 10:
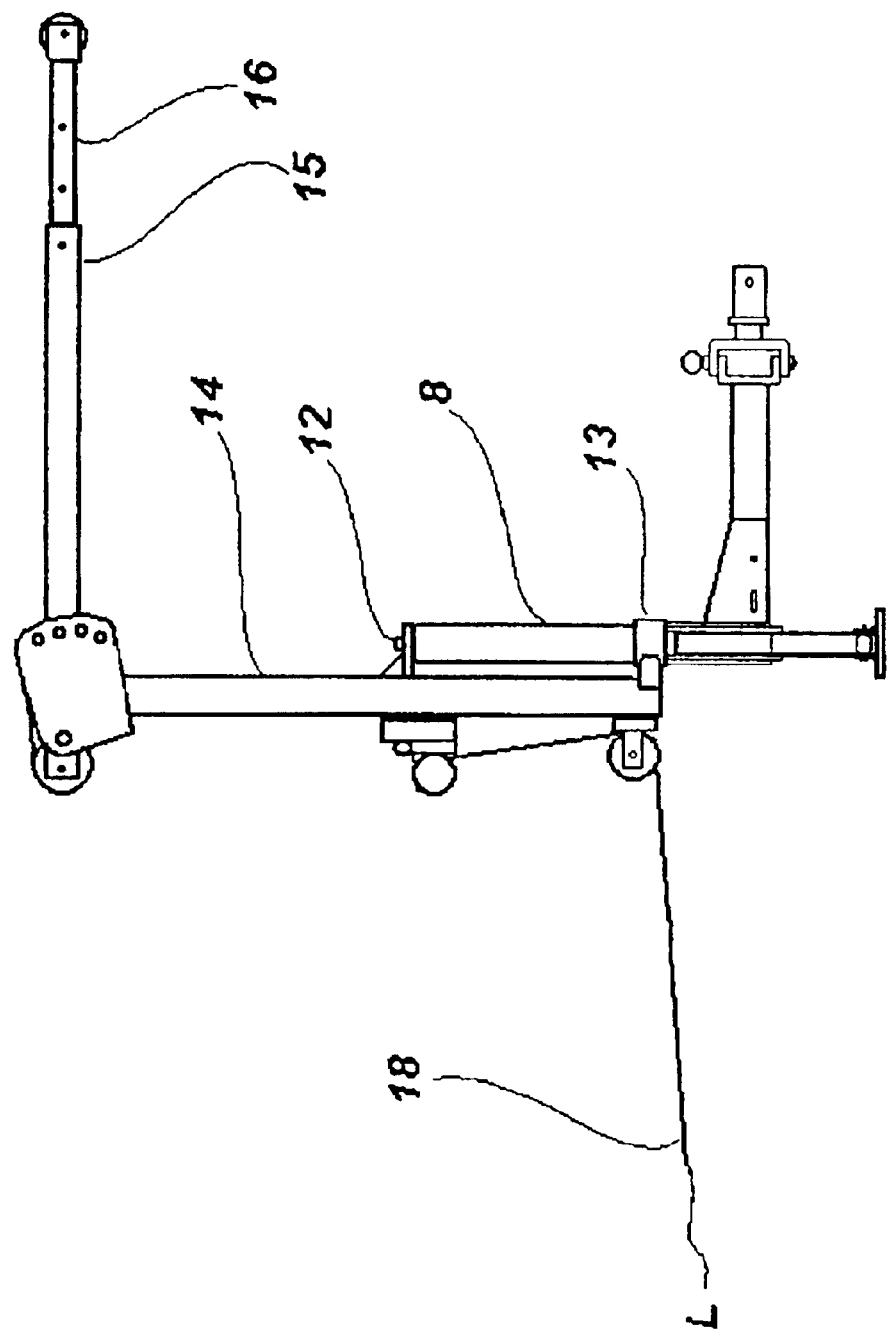
FIG. 10 is a side view of the hoist according to a first embodiment the invention being used as a winch.

Referring to FIG. 10 a hoist according to an embodiment of the invention is shown. In this view the hoist is used as a winch for dragging a load closer to the hoist to permit safe loading. A person of skill in the art of structural design will be aware that the hoist is best suited to lifting loads proximate, the boom support 14. By pulling the load closer to the hoist the amount of stress on the hoist when the load is lifted is reduced substantially.

Figure 11:
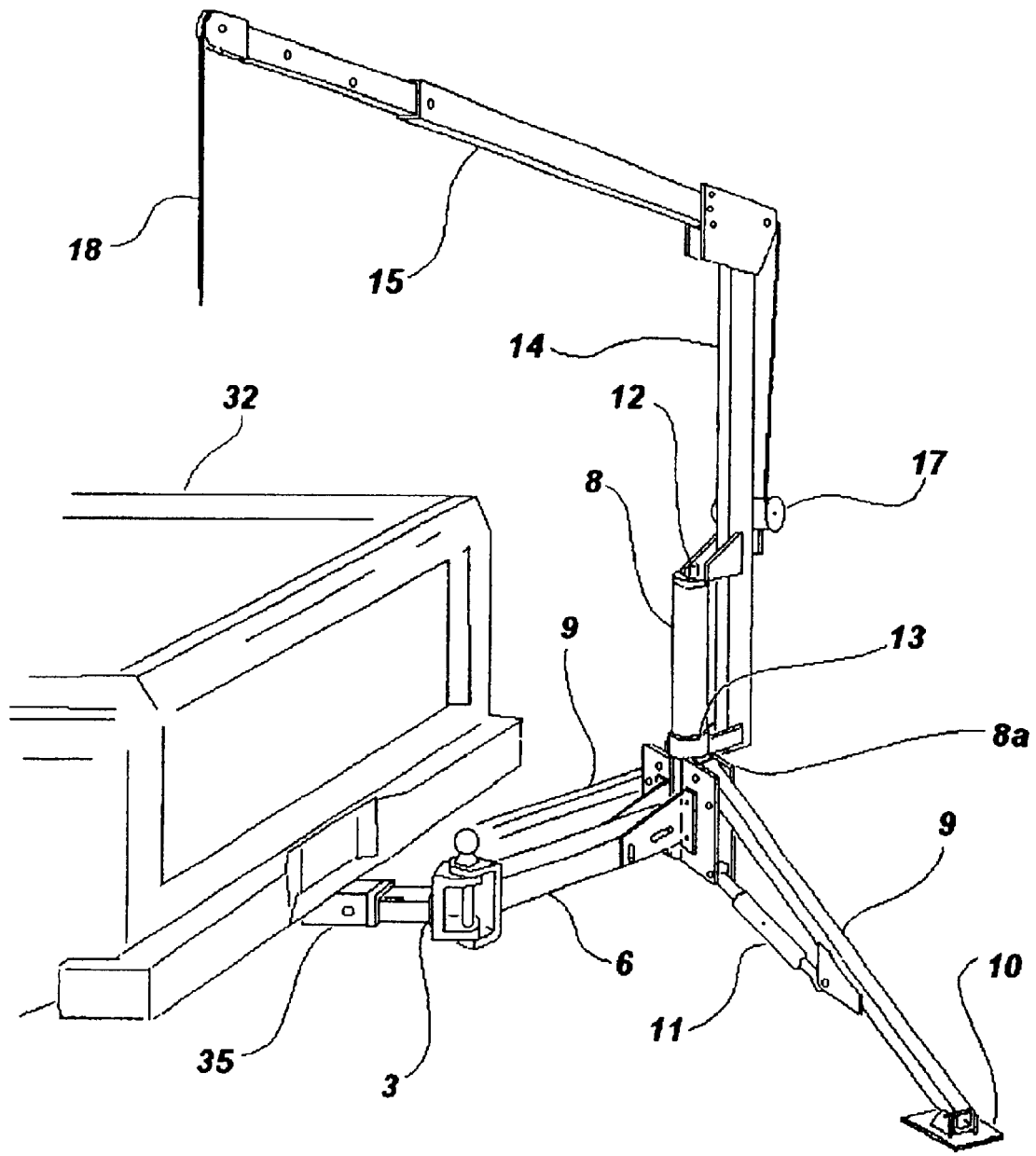
FIG. 11 is an isometric view of the hoist according to the invention.

Referring to FIG. 11, a hoist according to the invention is shown clearly illustrating the relative position of the hoist with respect to a pickup truck used to support it. The hoist is shown in a position to load or unload an item from the box of the pickup truck. As can be seen, in this orientation the hoist does not interfere with the tailgate of the pickup truck.

Figure 12:
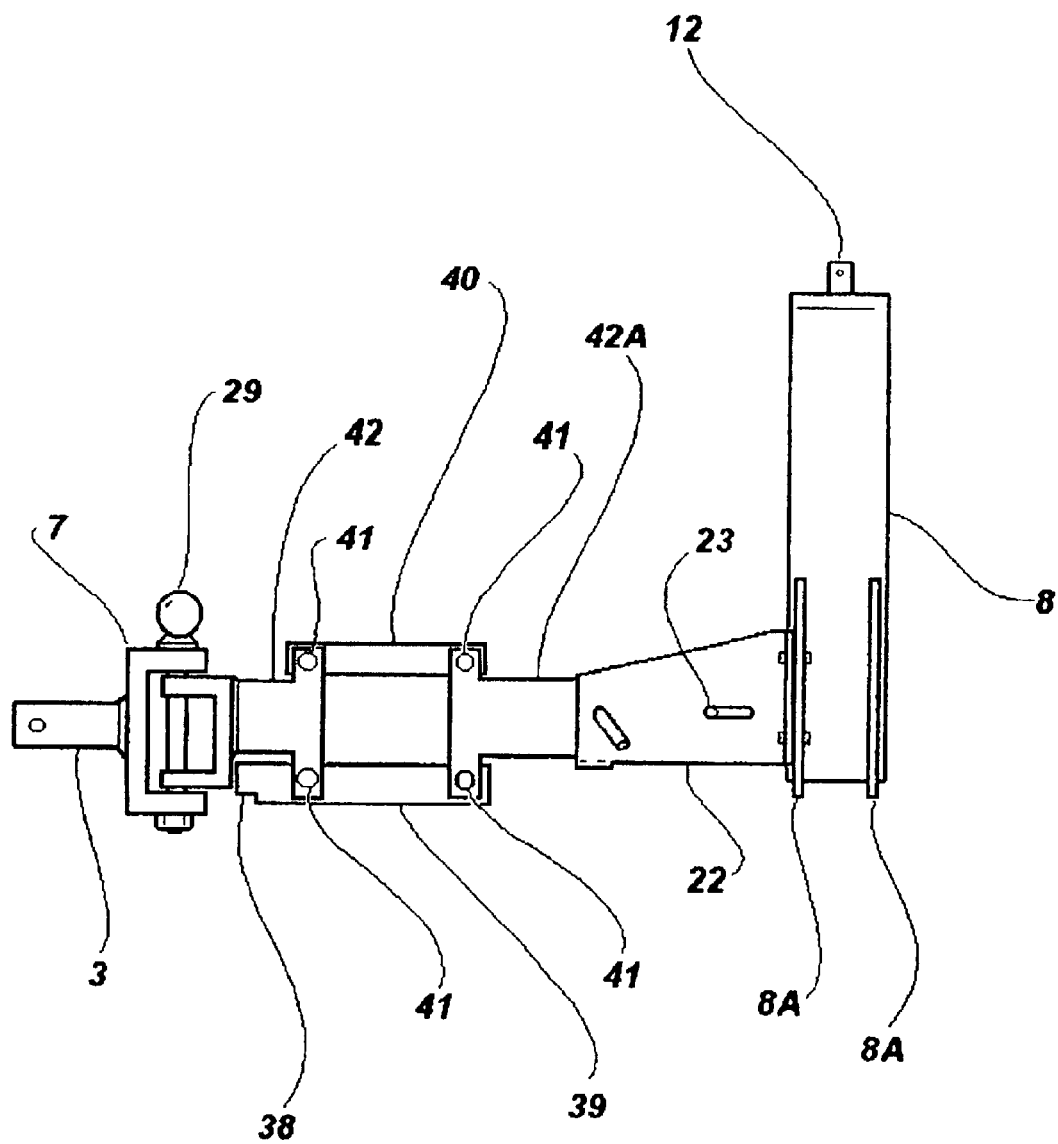
FIG. 12 is a side view of a variation of the hoist according to the invention with a mechanism to compensate for the changes in vehicle height as the vehicle is loaded.

Referring to FIG. 12 an alternative mechanism for the hoist tongue is presented. This mechanism permits the suspension of the vehicle to react to the loading and unloading of the vehicle and an optionally attached trailer. The mechanism includes a short tongue 42 connected to the ball 29 of the hoist assembly. The short tongue 42 is connected to a lower linkage 39 and an upper linkage 40. The lower linkage 39 and the upper linkage 40 are also connected to the long tongue 42a. The lower linkage 39 includes a stop feature 38 that limits the long tongue 42a to a horizontal position. The upper linkage 40 and the lower linkage 39 are mechanically coupled to the short tongue 42 and the long tongue 42a with pivot pins 41. This linkage is particularly advantageous because it permits the vehicle suspension to react to the loading of the vehicle and trailer without imparting high stress loads to the hoist. The mechanism supports the hoist such that as the vehicle is loaded, the hoist remains roughly vertical.

Another embodiment of the invention features a leg that extends directly downward from the jib post. This leg is set in position prior to loading the hoist. This configuration also provides enhanced structural stability for the hoist without adding a large amount of weight.

A variety of different embodiments of the invention incorporate different types of actuators. For example, a simple version of the hoist relies on manual input to raise and lower loads for the hoist. Another embodiment of the invention uses an electric winch that draws current from the battery of the vehicle. Still another embodiment of the invention incorporates a hydraulic winch. Also, the various joints of the hoist are optionally hydraulically actuated. Clearly a hoist according to the invention optionally incorporates any of these actuators or a combination of different actuators.

Variations in the design of a hoist according to the invention include using hydraulically actuated joints or, alternatively electrically actuated joints. Similarly, the winch used for lifting is optionally hand powered, hydraulic or electrically driven. Additionally, the hoist is optionally modular allowing individual components to be modified for specific tasks and substituted as necessary. For example, if the hoist is to be used in areas with very soft terrain then size of the members used to contact the ground are easily increased and substituted for the standard members.

Of course, though the legs are described herein as retracting, it is possible to implement the hoist with a fixed leg. Here the leg would support motion of the boom about the boom support. That said, it is a straightforward matter to design a leg that is slightly shorter than what is needed to support the boom support absent the boom being in place. As such, the leg is installed before the boom and the additional weight of the boom causes the leg to engage the ground and provide additional support. Of course, the hoist is also implementable with a leg that is driven toward the ground by the weight of the load and so forth.

Clearly, the embodiments presented herein are meant to be illustrative of the invention and not limiting the invention to the embodiments disclosed. Numerous other embodiments of the invention will be apparent to one of skill in the art of hoist design without departing from the spirit and the scope of the invention.

What is claimed is:

1. A hoist kit adapted for engagement with and structural support by a receiver hitch attachment, comprising:
   a hoist mount having a first end (insert) a second end (tongue) and a hinged joint disposed therebetween which provides rotational approximately lateral movement of the second end relative to the hinged joint when the first end is fixed, the first end which mechanically engages the receiver hitch;
   a jib post which extends approximately vertically, said jib post for being mechanically coupled to the second end of the hoist mount;
   a rotational boom support coupled to the jib post;
   a boom which extends from the boom support, said boom which bears a weight of an external load; and,
   a first leg which is mechanically coupled proximate the second end of the hoist mount which allows pivotal motion relative thereto between a first position which contacts a region of ground proximate a vehicle supporting said receiver hitch attachment and which structurally supports the hoist mount and a second retracted position.

2. A hoist kit according to claim 1, comprising a second leg which is mechanically coupled proximate the second end of the hoist mount which allows pivotal motion relative thereto between a first position which contacts a region of ground proximate a vehicle supporting said receiver hitch attachment which structurally supports the hoist mount and a second retracted position such that when the hoist mount is engaged with the receiver hitch and the hoist is assembled with the first leg in the first position and the second leg in the first position, the jib post is within a triangle formed by the first end of the hoist mount, the region of ground contacted by the second leg.

3. A hoist kit according to claim 1, wherein when the receiver hitch is mounted to a vehicle having a driver side and a passenger side, the vehicle having a main axis extending between a front end of the vehicle and a rear end of the vehicle about a centreline of the vehicle, said vehicle having a tailgate, said tailgate having an open position and a closed position and when assembled, the hoist does not interfere with the tailgate when the tailgate is in the open position when the hoist is optionally positioned away from the main axis of the vehicle on either of the driver's side and the passenger's side of the vehicle.

4. A hoist kit according to claim 1, comprising a second leg which is mechanically coupled proximate the second end of the hoist mount which allows pivotal motion relative thereto between a first position for contacting a region of ground proximate a vehicle supporting said receiver hitch attachment and the hoist is assembled with the first leg in the first position and the second leg in the first position, the jib post is within a triangle formed by the first end of the hoist mount, the region of ground contacted by the first leg and the region of ground contacted by the second leg.

5. A hoist adapted for engagement with and structural support by a receiver hitch attachment, comprising:

a hoist mount having a first end (insert) which mechanically engages a receiver hitch a second end (tongue) and a hinged joint disposed therebetween which provides rotational approximately lateral movement of the second end relative to the hinged joint when the first end is fixed;

a jib post extending approximately vertically, said jib post mechanically coupled to the second end of the hoist mount;

a rotational boom support coupled to the jib post;

a boom extending from the boom support, said boom which bears a weight of an external load; and, a first leg mechanically coupled proximate the second end of the hoist mount allowing pivotal motion relative thereto between a first position which contacts a region of ground proximate a vehicle supporting said trailer receiver hitch attachment and for which structurally supports the hoist mount and a second retracted position.

6. A hoist according to claim 5, comprising a second leg mechanically coupled proximate the second end of the hoist mount which allows pivotal motion relative thereto between a first position which contacts a region of ground proximate a vehicle supporting said receiver hitch attachment and which structurally supports the hoist mount and a second retracted position such that when the hoist mount is engaged with the receiver hitch and the hoist is assembled with the first leg in the first position and the second leg in the first position, the jib post is within a triangle formed by the first end of the hoist mount, the region of ground contacted by the first leg and the region of ground contacted by the second leg.

7. A hoist according to claim 5, wherein when the receiver hitch is mounted to a vehicle having a driver side and a passenger side, the vehicle having a main axis extending between a front end of the vehicle and a rear end of the vehicle about a centreline of the vehicle, said vehicle having a tailgate, said tailgate having an open position and a closed position and when assembled, the hoist does not interfere with the tailgate when the tailgate in in the open position when the hoist is optionally positioned away from the main axis of the vehicle on either of the driver's side and the passenger's side of the vehicle.

8. A hoist according to claim 5, wherein the first leg comprises a wheel wherein in the first position said wheel contacts a region of ground proximate a vehicle supporting said receiver hitch attachment which structurally supports the hoist mount and wherein in the second retracted position said wheel other than contacts the region of ground.

* * * * *